US012583796B2

(12) United States Patent
Kornmeyer et al.

(10) Patent No.: US 12,583,796 B2
(45) Date of Patent: Mar. 24, 2026

(54) METHOD FOR PRODUCING CARBONIZED OR GRAPHITIZED MOLDING PARTS

(71) Applicant: Nippon Kornmeyer Carbon Group GmbH, Windhagen (DE)

(72) Inventors: Torsten Kornmeyer, Königswinter (DE); David Klein, Hennef (DE)

(73) Assignee: Nippon Kornmeyer Carbon Group GmbH, Windhagen (DE)

( * ) Notice: Subject to any disclaimer, the term of this patent is extended or adjusted under 35 U.S.C. 154(b) by 131 days.

(21) Appl. No.: 18/572,612

(22) PCT Filed: Jun. 29, 2022

(86) PCT No.: PCT/EP2022/067849
§ 371 (c)(1),
(2) Date: Dec. 20, 2023

(87) PCT Pub. No.: WO2023/275123
PCT Pub. Date: Jan. 5, 2023

(65) Prior Publication Data
US 2024/0286962 A1      Aug. 29, 2024

(30) Foreign Application Priority Data

Jul. 1, 2021    (DE) ..................... 10 2021 117 025.7

(51) Int. Cl.
| | |
|---|---|
| *C04B 35/532* | (2006.01) |
| *C04B 35/626* | (2006.01) |
| *C04B 35/634* | (2006.01) |
| *C04B 35/636* | (2006.01) |
| *C04B 35/83* | (2006.01) |

(52) U.S. Cl.
CPC ........ *C04B 35/532* (2013.01); *C04B 35/6267* (2013.01); *C04B 35/63444* (2013.01); *C04B 35/6365* (2013.01); *C04B 35/83* (2013.01); *C04B 2235/48* (2013.01); *C04B 2235/5212* (2013.01); *C04B 2235/5248* (2013.01); *C04B 2235/6562* (2013.01); *C04B 2235/6567* (2013.01)

(58) Field of Classification Search
CPC ... C04B 35/532; C04B 35/626; C04B 35/634;

C04B 35/636; C04B 35/83; C04B 2235/48; C04B 2235/5212; C04B 2235/5248; C04B 2235/6562; C04B 2235/6567
See application file for complete search history.

(56) References Cited

U.S. PATENT DOCUMENTS

| | | | | |
|---|---|---|---|---|
| 3,337,526 A | * | 8/1967 | Adams .................. | C08B 37/006 |
| | | | | 536/123 |
| 3,927,157 A | * | 12/1975 | Vasterling ............... | C04B 35/83 |
| | | | | 423/447.4 |
| 5,076,974 A | | 12/1991 | Modrek et al. | |
| 11,795,112 B2 | * | 10/2023 | Öttinger ................ | C04B 35/532 |
| 2015/0375419 A1 | * | 12/2015 | Günther ................... | B28B 7/36 |
| | | | | 106/38.22 |
| 2018/0339946 A1 | | 11/2018 | Öttinger et al. | |

FOREIGN PATENT DOCUMENTS

| | | |
|---|---|---|
| DE | 69105668 T | 4/1995 |
| DE | 102011007074 A1 | 10/2012 |
| EP | 1524253 A1 | 6/2007 |
| JP | S60112609 A | 6/1985 |
| WO | 2016200469 * | 12/2016 ............... H01B 1/14 |

OTHER PUBLICATIONS

U.S. Appl. No. 18/494,811, filed Oct. 26, 2023, David Klein.

* cited by examiner

*Primary Examiner* — Alison L Hindenlang
*Assistant Examiner* — Shibin Liang
(74) *Attorney, Agent, or Firm* — Smartpat PLC

(57) ABSTRACT

A method for producing carbonized or graphitized molding parts is particularly simple to implement and also allows producing complex molding parts without mechanical post-processing. This is achieved by the production of a pourable liquid polymer mixture which is as homogenized as possible, consisting of a carbon granulate, pitch, soot or graphite powder and polyacrylnitrile dissolved in a solvent, filling the liquid polymer mixture into a casting mold and immersing the filled casting mold in water over a predetermined period of time until the polymer mixture is sufficiently cured and dimensionally stable, and subsequent breaking of the casting mold and stabilizing the prefabricated cured molding part by uniform heating up in a furnace in air at a predefined temperature for stabilizing and degassing volatile constituents, and performing a high-temperature treatment for carbonizing or graphitizing the molding part in a furnace under protective gas.

11 Claims, No Drawings

METHOD FOR PRODUCING CARBONIZED OR GRAPHITIZED MOLDING PARTS

CROSS-REFERENCE TO RELATED APPLICATION

This application is a national stage application, filed under 35 U.S.C. § 371, of International Patent Application PCT/EP2022/067849, filed on Jun. 29, 2022, which claims the benefit of German Patent Application DE 10 2021 117 025.7, filed on Jul. 1, 2021.

TECHNICAL FIELD

The disclosure relates to a method for producing carbonized or graphitized moldings.

BACKGROUND

Carbonized or graphitized moldings, which are also suitable for high-temperature applications, may be any desired three-dimensional components, such as linings for furnaces, construction components or else any desired hollow bodies, containers or crucibles.

Since it is not possible to produce the moldings by simple shaping of carbon black or graphite and subsequent sintering, a suitable carbon-containing and moldable compound generally needs to be produced. For this purpose, it is customary to mix carbon black, cokes or graphites in the form of granules with a suitable binder, such as a thermoplastic binder. Useful binders also include pitch based on coal tar or on petroleum pitch, or else synthetic resins.

These mixtures are then molded to form a green molding by pressing and carbonized in a furnace at about 3000° C., where the binder decomposes into volatile constituents. Carbon and binder coke remain as remnants of the binder in the form of a porous structure.

Alternatively, the green molding can also be arranged as a resistance element in a furnace between electrodes and heated by current flow.

SUMMARY

The disclosure is based on the object of providing a method for producing carbonized or graphitized moldings which is particularly simple to realize and which also enables the production of complex moldings without mechanical post-processing.

This is achieved by producing a liquid polymeric mixture which is homogenized as well as possible and consists of carbon granules, pitch, carbon black or graphite powder and fibrous materials, cellulose, starch and polyacrylonitrile, dissolved in an organic solvent, pouring the pourable polymeric mixture into a casting mold and immersing the filled casting mold in water for a defined period of time until the polymeric mixture has cured to form a molding and is dimensionally stable, subsequently breaking away the casting mold and stabilizing the prefabricated hardened molding by heating in a furnace in an air atmosphere to a defined temperature for the purposes of stabilization and outgassing of volatile constituents from the molding and carrying out a high-temperature treatment of the molding in order to carbonize or graphitize the molding in a furnace under protective gas or reduced pressure.

In order to influence the strength or porosity of the carbonized or graphitized molding to be produced, the polymeric mixture may be admixed with natural fibers such as bamboo fibers or graphite fibers as fibrous materials.

The polymeric mixture is homogenized at room temperature, the homogenization of the polymeric mixture being performed at approx. 160° C. and if the mixture comprises a high-temperature pitch with a melting point of 120° C., until this has melted.

In a continuation of the method, the casting mold filled with the polymeric mixture is immersed in water for several hours or days in order to cure and form the molding. After the molding has cured, it can be broken out of the mold.

This is followed by a stabilization and homogenization procedure of the prefabricated hardened molding in air at a stabilization temperature of 140° C. to at most 450° C., preference being given to a temperature of 250° C.

The prefabricated hardened molding may be stabilized and homogenized during the heating of the furnace to the stabilization temperature.

In a further continuation, the prefabricated molding is carbonized at a constant temperature of approx. 1000° C. until pure carbon with a different crystal structure is formed.

In another continuation of the method, the prefabricated molding is graphitized at a constant temperature from 2000° C.

Finally, the prefabricated molding may be fully graphitized at a temperature of above 2500° C.

It will be apparent that the carbonization, graphitization and the full graphitization are each performed under protective gas. A suitable protective gas is argon or helium.

Preferably, the graphitization is effected with a heating ramp of 1° C./min until the target temperature has been reached, followed by tempering for approx. 30 min, with tempering for several hours also being possible.

It is possible in principle to also admix the polymeric mixture with a metal powder or silicon powder, so that metal carbides or silicon carbides are formed in a high-temperature treatment of the prefabricated molding at >1000° C. under protective gas.

Due to the relatively low health risk, preference is given to using dimethyl sulfoxide as solvent for the polyacrylonitrile, with dimethylformamide or N-methyl-2-pyrrolidone also being suitable in principle as solvent.

DETAILED DESCRIPTION

The method is explained in more detail below on the basis of an exemplary embodiment.

The basic concept of the method is that of first producing a pourable liquid that is easy to handle and can easily be cast into a casting mold.

For this purpose, a polymeric mixture consisting of polyacrylonitrile dissolved in a solvent, such as dimethyl sulfoxide, is produced, with pitch and/or carbon black and/or graphite powder and fibrous materials, cellulose etc. subsequently being admixed until the mixture has a pourable consistency.

This mixture is then homogenized at room temperature, or at approx. 160° C. if the mixture comprises pitch in order to melt the pitch.

The homogenized mixture is subsequently poured into a casting mold which is then completely immersed in water until the mixture has sufficiently cured and is dimensionally stable. This procedure can last several hours or a few days, this depending on the mixing ratio of the mixture.

Following this, the casting mold can be broken away and the prefabricated hardened molding can be stabilized.

This is effected in air at a stabilization temperature of 140° C. to at most 450° C., preference being given to a temperature of 250° C., it also being possible for the prefabricated molding to be stabilized during the heating of the furnace to the stabilization temperature.

The molding prefabricated in this way is subsequently carbonized at a constant temperature of approx. 1000° C. until pure carbon with a different crystal structure is formed.

It is also possible to then graphitize the prefabricated molding at a constant temperature from 2000° C., or to fully graphitize it at a temperature of above 2500° C.

To avoid thermal stresses, the graphitization is preferably effected with a heating ramp of 1° C./min until the target temperature has been reached, followed by tempering for approx. 30 min.

The method results, so to speak, in three products, namely moldings made of carbon, graphite with a different structure and full graphite in a pure structure.

Alternatively, the polymeric mixture can also be admixed with a metal powder or silicon powder, so that metal carbides or silicon carbides are formed in a high-temperature treatment of the prefabricated molding at >1000° C., which enables further production of further products.

The advantage of the method lies in the ease of handling and in the possibility of also being able to produce complex moldings without machine finishing.

The invention claimed is:

1. A method for producing carbonized or graphitized moldings, comprising:

producing a pourable homogenized polymeric mixture, consisting of polyacrylonitrile, dissolved in an organic solvent, which is admixed with carbon granules, pitch, carbon black, or graphite powder, and fibrous materials, cellulose, or starch until the mixture has a pourable consistency;

homogenizing the mixture at room temperature, or at 160° C. if the mixture comprises pitch;

pouring the pourable homogenized polymeric mixture into a casting mold;

completely immersing the casting mold filled with the polymeric mixture in water for a defined period of time of several hours to days until the polymeric mixture in the casting mold has cured to form a prefabricated hardened molding and is dimensionally stable;

subsequently breaking away the casting mold and stabilizing the prefabricated hardened molding by heating in a furnace in an air atmosphere to a stabilization temperature of 140° C. to 450° C. for stabilization and outgassing of volatile constituents from the molding; and carrying out a high-temperature treatment in order to carbonize at a constant temperature of 1000° C. or graphitize the molding at a constant temperature from 2000° C. in a furnace under protective gas or reduced pressure.

2. The method as claimed in claim 1,
wherein the fibrous materials are bamboo fibers or graphite fibers.

3. The method as claimed in claim 1,
wherein the polymeric mixture is homogenized at room temperature, the homogenization of the polymeric mixture being performed at 160° C. if pitch is admixed until the pitch has melted.

4. The method as claimed in claim 1,
wherein the casting mold filled with the polymeric mixture is immersed in water for several hours or days in order to cure and form a molding.

5. The method as claimed in claim 1,
wherein the prefabricated hardened molding is stabilized and homogenized at a temperature of 250° C.

6. The method as claimed in claim 5,
wherein the prefabricated hardened molding is stabilized and homogenized during the heating of the furnace to the stabilization temperature.

7. The method as claimed in claim 1,
wherein the prefabricated hardened molding is carbonized at a constant temperature of 1000° C. until pure carbon with a different crystal structure is formed.

8. The method as claimed in claim 1,
wherein the prefabricated hardened molding is graphitized at a constant temperature from 2000° C.

9. The method as claimed in claim 8,
wherein the graphitization is effected with a heating ramp of 1° C./min until the constant temperature has been reached, followed by tempering for >30 min.

10. The method as claimed in claim 1,
wherein the prefabricated hardened molding is fully graphitized at a temperature of above 2500° C.

11. The method as claimed in claim 1,
wherein the solvent used is dimethyl sulfoxide, dimethylformamide or N-methyl-2-pyrrolidone.

* * * * *